US012617540B2

(12) United States Patent
Terwilliger et al.

(10) Patent No.: US 12,617,540 B2
(45) Date of Patent: May 5, 2026

(54) AFT AIR INLET PARTICLE SEPARATOR FOR TURBINE ENGINE

(71) Applicant: RTX CORPORATION, Farmington, CT (US)

(72) Inventors: Neil J. Terwilliger, Cheshire, CT (US); Joseph B. Staubach, Colchester, CT (US)

(73) Assignee: RTX CORPORATION, Farmington, CT (US)

( * ) Notice: Subject to any disclaimer, the term of this patent is extended or adjusted under 35 U.S.C. 154(b) by 3 days.

(21) Appl. No.: 18/405,712

(22) Filed: Jan. 5, 2024

(65) Prior Publication Data

US 2024/0262523 A1 Aug. 8, 2024

Related U.S. Application Data

(60) Provisional application No. 63/443,106, filed on Feb. 3, 2023.

(51) Int. Cl.
| | |
|---|---|
| *B64D 33/02* | (2006.01) |
| *B64D 33/04* | (2006.01) |
| *F02C 7/052* | (2006.01) |
| *F02C 7/04* | (2006.01) |

(52) U.S. Cl.
CPC ............. *B64D 33/02* (2013.01); *B64D 33/04* (2013.01); *F02C 7/052* (2013.01); *B64D 2033/0286* (2013.01); *F02C 7/04* (2013.01)

(58) Field of Classification Search
CPC ............. B64D 33/02; F02C 7/04; F02C 7/052
See application file for complete search history.

(56) References Cited

U.S. PATENT DOCUMENTS

| | | | |
|---|---|---|---|
| 3,131,536 A | 5/1964 | Snell | |
| 6,134,874 A | 10/2000 | Stoten | |
| 8,955,304 B2* | 2/2015 | Suciu | F02C 7/04 |
| | | | 60/226.3 |
| 9,644,537 B2 | 5/2017 | Suciu et al. | |
| 9,726,112 B2* | 8/2017 | Suciu | F02K 3/06 |
| 9,897,040 B2* | 2/2018 | Suciu | F02K 1/60 |
| 10,202,941 B2 | 2/2019 | Suciu et al. | |
| 10,245,540 B2 | 4/2019 | Bisson et al. | |
| 2015/0322855 A1* | 11/2015 | Kupratis | F02C 3/06 |
| | | | 60/805 |
| 2016/0169102 A1* | 6/2016 | Hanrahan | F02K 3/115 |
| | | | 60/39.42 |
| 2017/0241341 A1 | 8/2017 | Gekht et al. | |

FOREIGN PATENT DOCUMENTS

CN 113834096 A 12/2021

OTHER PUBLICATIONS

Extended European Search Report for European Application No. 24155642.2 mailed Jun. 17, 2024.

* cited by examiner

*Primary Examiner* — Lorne E Meade
(74) *Attorney, Agent, or Firm* — Carlson, Gaskey & Olds, P.C.

(57) ABSTRACT

A propulsion system for an aircraft includes a gas generating core engine, a propulsor that is driven by an exhaust gas flow that is generated by the core engine, and an inlet assembly where an inlet airflow is communicated to the core engine. The inlet assembly is disposed aft of the core engine and includes a turning duct that directs inlet air into the core engine, and a particle exhaust outlet that directs particulates away from the core engine.

11 Claims, 3 Drawing Sheets

AFT AIR INLET PARTICLE SEPARATOR FOR TURBINE ENGINE

CROSS REFERENCE TO RELATED APPLICATION

This application claims priority to U.S. Provisional Application Ser. No.: 63/443,106 filed on Feb. 3, 2023.

STATEMENT REGARDING FEDERALLY SPONSORED RESEARCH OR DEVELOPMENT

This invention was made with Government support under Contract DE-AR0001561 awarded by the United States Department of Energy, Office of ARPA-E. The Government has certain rights in this invention.

TECHNICAL FIELD

The present disclosure relates generally to a turbine engine with an aft air inlet duct and more particularly to a particle separator for an aft inlet.

BACKGROUND

Reduction and/or elimination of carbon emissions generated by aircraft operation is a stated goal of aircraft manufacturers and airline operators. Gas turbine engines compress incoming core airflow, mix the compressed airflow with fuel that is ignited in a combustor to generate a high energy exhaust gas flow. Alternative fuels and steam injection can reduce undesired engine emissions but present new challenges. Alternate engine architectures may provide increased engine efficiencies that further enable use of alternate fuels. The addition of steam injection can further increase engine efficiencies. Such engine architecture can include an aft air inlet where inlet air is driven engine forward. An aft inlet is more susceptible to mixing of particulate matter with the expelled gas flows.

Turbine engine manufacturers continue to seek further improvements to engine performance including improvements to reduce environmental impact while improving propulsive efficiencies.

SUMMARY

A propulsion system for an aircraft according to an exemplary embodiment of this disclosure includes, among other possible things, a gas generating core engine, a propulsor that is driven by an exhaust gas flow that is generated by the core engine, an inlet assembly where an inlet airflow is communicated to the core engine, the inlet assembly is disposed aft of the core engine and includes a turning duct that directs inlet air into the core engine, and a particle exhaust outlet that directs particulates away from the core engine.

In a further embodiment of the foregoing, the propulsion system includes an exhaust duct that routes an exhaust gas flow away from the core engine. The exhaust duct is spaced radially apart from an inlet of the turning duct.

In a further embodiment of any of the foregoing propulsion systems, the exhaust duct is spaced radially apart from the particle exhaust outlet.

In a further embodiment of any of the foregoing, the propulsion system includes a nacelle that surrounds the core engine and defines a bypass flow path. The exhaust duct is disposed within the nacelle.

In a further embodiment of any of the foregoing, the propulsion system includes a mounting structure that attaches the engine to a portion of an airframe. At least a portion of the exhaust duct is disposed within the mounting structure or the portion of the airframe.

In a further embodiment of any of the foregoing, the propulsion system includes a fluid flow path where a pressurized fluid flow is introduced into the exhaust duct and mixed with the exhaust gas flow to prevent mixing with particulates that are exhausted through the particulate exhaust outlet.

In a further embodiment of any of the foregoing, the propulsion system includes a condenser where water is extracted from the exhaust gas flow. A portion of the water extracted from the exhaust gas flow is pressurized and communicated through the fluid flow path as the pressurized fluid flow.

In a further embodiment of any of the foregoing, the propulsion system includes an evaporator where at least a portion of water extracted by the condenser is transformed into a steam flow and the steam flow is injected into the core engine.

In a further embodiment of any of the foregoing propulsion systems, the inlet assembly includes an annular inlet opening that communicates an inlet airflow to the turning duct. The turning duct is configured to turn the inlet airflow radially inward and axially forward through an outlet where the inlet airflow is directed axially forward into the core engine. The inlet assembly includes a particle inlet that is disposed radially outward from the turning duct. The particle inlet is where particles within the inlet airflow are directed toward the particulate exhaust outlet.

In a further embodiment of any of the foregoing propulsion systems, the particle inlet is an annular opening that is aft of the annular inlet opening for inlet airflow.

In a further embodiment of any of the foregoing propulsion systems, the core engine includes a turbine section engine forward of a combustor section and a compressor section and the inlet assembly communicates inlet airflow into the compressor section.

In a further embodiment of any of the foregoing, the propulsion system includes a power turbine that is coupled to drive the propulsor. The power turbine is engine forward of the turbine section and is rotatable independent of the turbine section by at least a portion of the exhaust gas flow.

A propulsion system for an aircraft according to another exemplary embodiment of this disclosure includes, among other possible things, a gas generating core engine where an exhaust gas flow is generated to drive a turbine section that is engine forward of a combustor section and a compressor section. A propulsor is driven by a gas flow that is generated by the core engine. A power turbine is coupled to drive the propulsor, the power turbine is engine forward of the turbine section and is rotatable independent of the turbine section by at least a portion of the exhaust gas flow. An inlet assembly where an inlet airflow is communicated to the core engine, the inlet assembly is disposed aft of the core engine and includes an inlet, a turning duct where inlet airflow is communicated engine forward into the compressor section and a particle exhaust outlet that directs particulates away from the core engine. An exhaust duct routes an exhaust gas flow away from the core engine, the exhaust duct is spaced radially apart from an inlet of the turning duct.

In a further embodiment of the foregoing, the propulsion system includes a nacelle that surrounds the core engine and defines a bypass flow path. At least a portion of the exhaust duct is disposed within the nacelle.

In a further embodiment of any of the foregoing, the propulsion system includes a condenser where water is extracted from the exhaust gas flow. A portion of the water extracted from the exhaust gas flow is pressurized and communicated through a fluid flow path as a pressurized fluid flow for separating the exhaust gas flow from the inlet airflow.

In a further embodiment of any of the foregoing propulsion systems, the pressurized fluid flow is provided at a velocity greater than a velocity of the exhaust gas flow.

In a further embodiment of any of the foregoing propulsion systems, the inlet assembly includes an annular inlet opening that communicates an inlet airflow to the turning duct. The turning duct is configured to turn the inlet airflow radially inward and axially forward through an outlet where the inlet airflow is directed axially forward into the core engine. The inlet assembly includes a particle inlet that is disposed radially outward from the turning duct. The particle inlet is where particles within the inlet airflow are directed toward the particulate exhaust outlet.

A method of separating particulates from an inlet airflow for a turbine engine, the method, according to another exemplary embodiment of this disclosure includes, among other possible things, an inlet assembly aft of a core engine configured to include a turning duct where an inlet airflow is turned radially inward and axially forward, and providing a particulate flow path radially outward of an inlet airflow path into the turning duct and communicating a particulate flow through the particulate flow path and through a particulate outlet away from the core engine.

In a further embodiment of the foregoing, the method further includes configuring an exhaust duct to expel an exhaust gas flow radially outward from the particulate outlet.

In a further embodiment of any of the foregoing, the method further includes configuring a fluid flow path for a pressurized fluid flow radially inward of the exhaust gas flow and radially outward of the inlet airflow.

Although the different examples have the specific components shown in the illustrations, embodiments of this invention are not limited to those particular combinations. It is possible to use some of the components or features from one of the examples in combination with features or components from another one of the examples.

These and other features disclosed herein can be best understood from the following specification and drawings, the following of which is a brief description.

DETAILED DESCRIPTION

Figures 1, 2, 3:
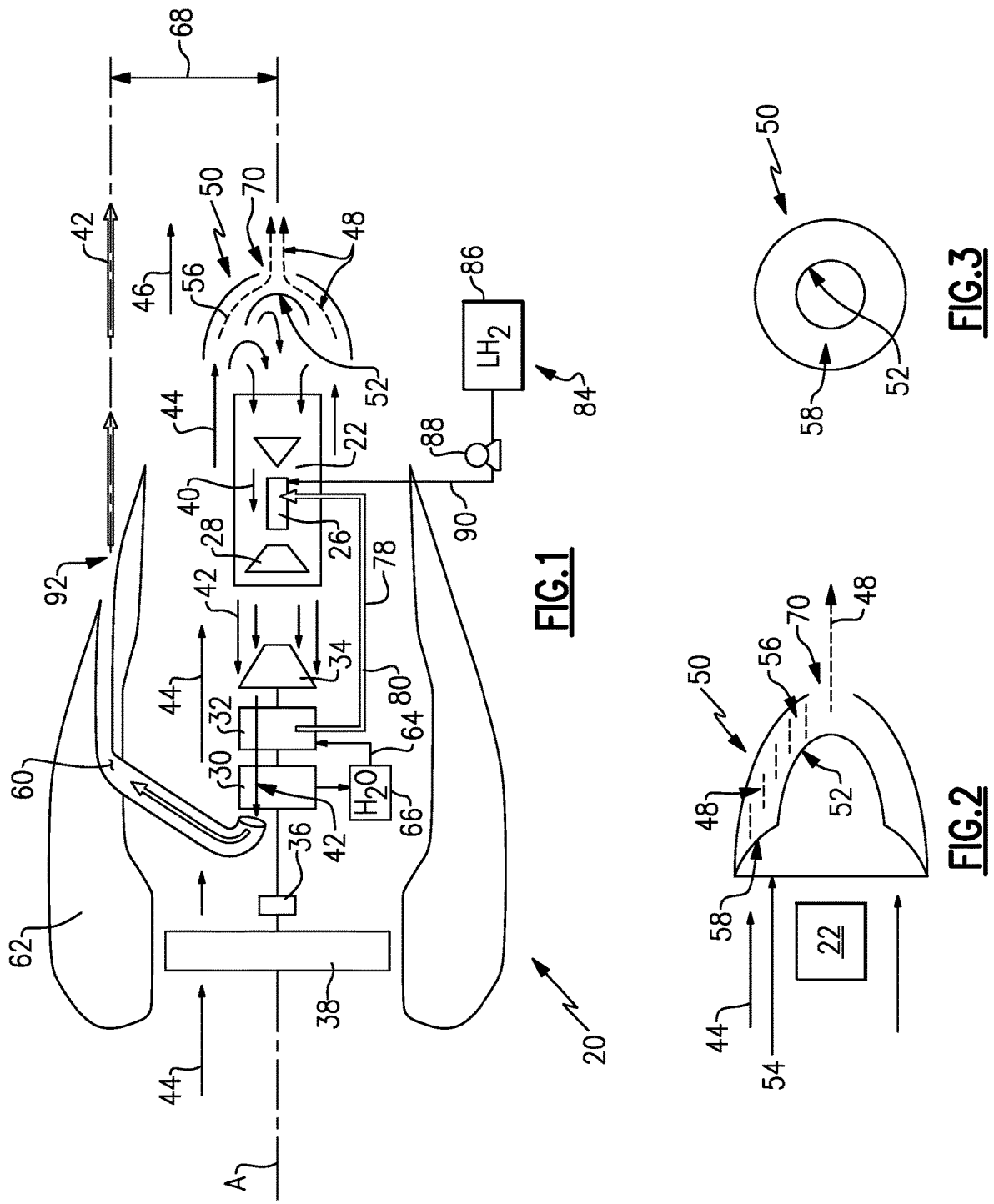
FIG. 1 is a schematic view of an example propulsion system embodiment.
FIG. 2 is a schematic view of an example inlet assembly embodiment.
FIG. 3 is a schematic view along an engine longitudinal axis of the inlet assembly of FIG. 2.

FIG. 1 schematically illustrates an example reverse flow hydrogen steam injected turbine engine assembly that is generally indicated at 20. The engine 20 includes an aft inlet assembly 50, which includes features for separating particulate matter from an inlet airflow 44 communicated to a core engine 22.

A core airflow 40 is routed through a gas generating core engine 22. The core airflow is routed through a compressor section 24, a combustor 36 and a turbine section 28 arranged along an engine longitudinal axis A. The turbine section 28 is physically located engine forward, but downstream, of the compressor section 24 and the combustor 36. A power turbine 34 is spaced apart from the turbine section 28 and receives exhaust gas flow 42 from the gas generating core engine 22. The gas flow 42 expands through power turbine 34 to drive a propulsor. In this disclosed sample embodiment, the propulsor is a fan 38 driven through a speed reduction gearbox 36.

The fan 38 drives the inlet airflow 44 past the core engine 22 to the aft inlet assembly 50. The aft inlet assembly 50 includes a turning duct 52 and a particulate flow passage 56 for separating particulate matter from the inlet airflow 44.

Inlet airflow 44 received in the compressor section 24 is compressed and communicated as core flow 40 engine forward to the combustor 26. In the combustor 26, the core flow 40 is mixed with a hydrogen ($H_2$) fuel flow 90 and ignited to generate the high energy exhaust gas flow 42 that expands through the turbine section 28 where energy is extracted and utilized to drive the compressor section 24. The exhaust gas flow 42 exhausted from the turbine section 28 of the gas generating core engine 22 is communicated to the power turbine 34.

The power turbine 34 drives the fan 38 through the gearbox 36. In this disclosed embodiment, the fan 38 is driven through a gearbox 36 at a speed different than the power turbine 34. It should be appreciated, that the fan 38 may be driven directly by the power turbine 34 at a speed different than the turbine section 28 because it is not coupled to the gas generating core engine 22 and is not required to drive any portion of the compressor section 24. A bypass flow 46 may bypass the core engine 22.

The exhaust gas flow 42 from the power turbine 34 is communicated through an evaporator 32 and a condenser 30. The condenser 30 extracts water from the exhaust gas flow 42 that is communicated to a water tank 66. From the water tank 66, a water flow 74 is communicated to the evaporator 32. In the evaporator 32, the water flow 74 is transformed into a steam flow 80 using heat from the exhaust gas flow 42. The steam flow 80 is communicated to the core engine 22 and injected into the core flow 40.

The engine 20 is configured to burn hydrogen provide by a fuel system 84. The fuel system 84 includes a liquid hydrogen ($LH_2$) tank 86 in communication with at least one pump 88. The pump 88 drives the fuel flow 90 to the combustor 26. Burning of a hydrogen based fuel can add additional moisture to the core gas flow 40 and the exhaust gas flow 42. The hydrogen based fuel flow 90 along with the injected steam flow 80 combine to introduce more moisture into the exhaust gas flow 42. The high moisture content combined with particulate matter may cause visible emissions from the engine assembly 22. The disclosed inlet assembly 50 removes particulate matter from the inlet flow 42 to substantially reduce visible emissions.

Referring to FIGS. 2 and 3 with continued reference to FIG. 1, the example inlet assembly 50 includes the turning duct 52 that guides inlet airflow 44 forward into the core engine 22. Heavier particulate matter in a particulate flow 48 remains radially outward of the turning duct 52 and continues axially aft into a particulate passage 56. The particulate passage 56 includes a particulate inlet 58 that is spaced axially aft of an inlet opening 54 for the inlet airflow 44. The turning duct 52 includes a curved shape to turn the inlet airflow 44 forward into the core engine 22.

The particulate inlet 58 is disposed radially outward from the inlet opening 54. In one disclosed example embodiment, particulate inlet 58 is annularly shaped and disposed about the turning duct 52 as is best shown in FIG. 3. Heavier particulate matter does not turn radially inward with the inlet airflow 44 and instead proceeds further aft into the particulate passage 56. The particulate flow 48 is then expelled to the ambient environment through a particulate outlet 70. In one disclosed example, the particulate outlet 70 is disposed about the engine longitudinal axis A.

The core engine 22 and fan 38 are disposed within a nacelle 62. An exhaust gas duct 60 is defined in the nacelle 62 to prevent mixing with the particulate flow 48. The exhaust gas duct 60 receives exhaust gas flow 42 expelled from the condenser 30. The exhaust gas duct 60 contains the exhaust gas flow 42 as it is routed radially outward into the nacelle 62. The duct 60 extends axially aft within the nacelle 62 where exhaust gas flow 42 is expelled into the ambient environment. An exhaust outlet opening 92 is spaced radially apart a distance 68 from the particulate outlet 70 to prevent mixing of exhaust gases and particulate matter.

Figure 4:
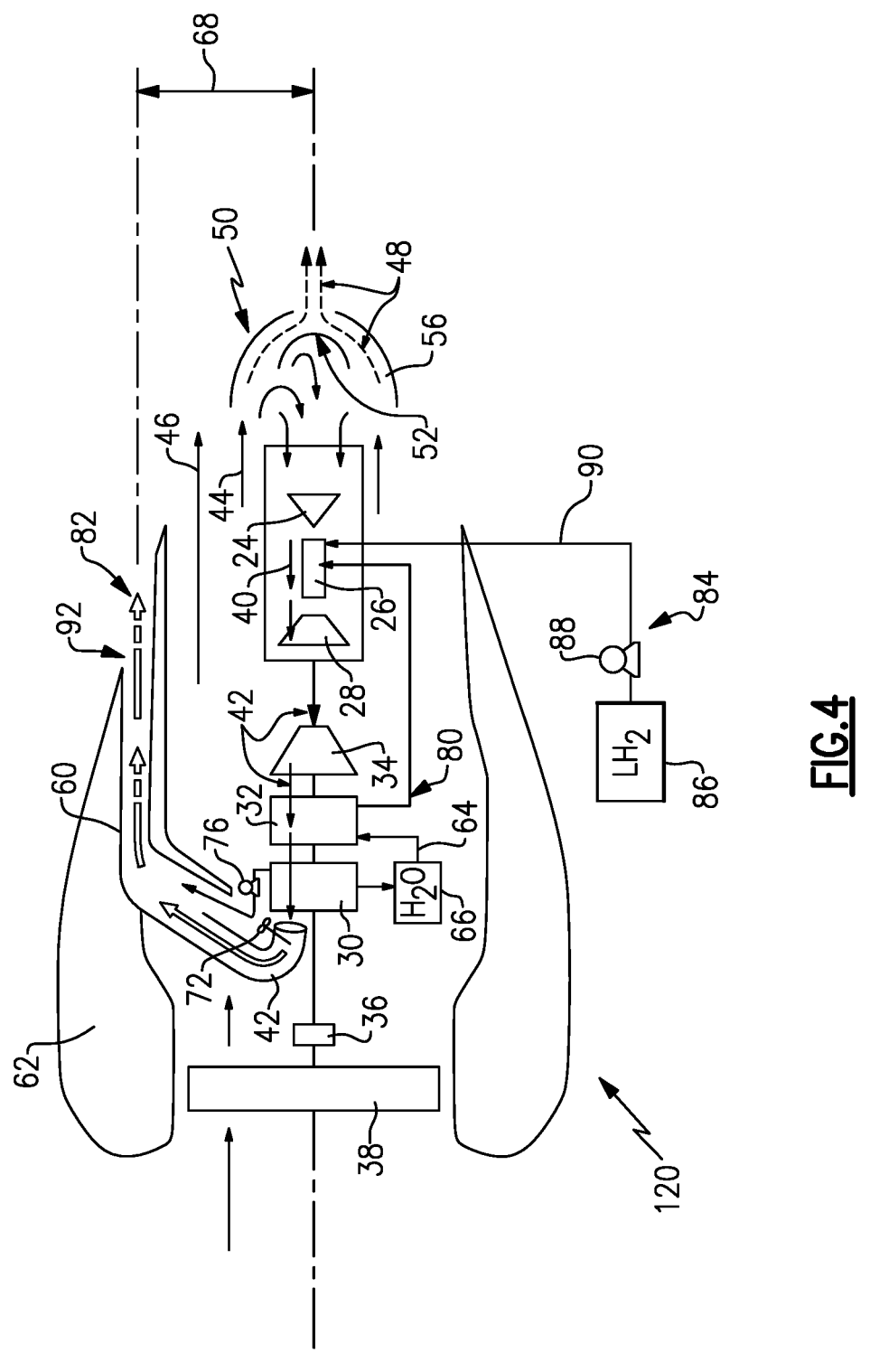
FIG. 4 is a schematic view of another example propulsion system embodiment.

Referring to FIG. 4, another example engine assembly 120 is schematically shown and includes a water passage 72 for a pressurized water flow 74. Water extracted by the condenser 30 is pressurized by a pump 76 to generate the pressurized water flow 74. The pressurized water flow 74 is mixed with the exhaust gas flow 42 to form a mixed flow 82 that is expelled to the ambient environment through the outlet 92. The pressurized water flow 74 increases momentum of the mixed flow 84 to further push aft of the outlet 92. By ejecting liquid water in the mixed flow 82 instead of water vapor, diffusion is reduced and mixing of the exhausted water with the particulate flow 48 is reduced. Moreover, the exhausted liquid water flow 82 has a higher velocity than the particle flow 48.

In one disclosed embodiment, the pump 76 generates the pressurized water flow 74 to a pressure that adds propulsive thrust. The condenser 30 is sized to extract a sufficient amount of water from the exhaust gas flow 42 to provide both the pressurized flow 74 and the water flow 64 to the evaporator 32 for steam generation.

Figures 5, 6:
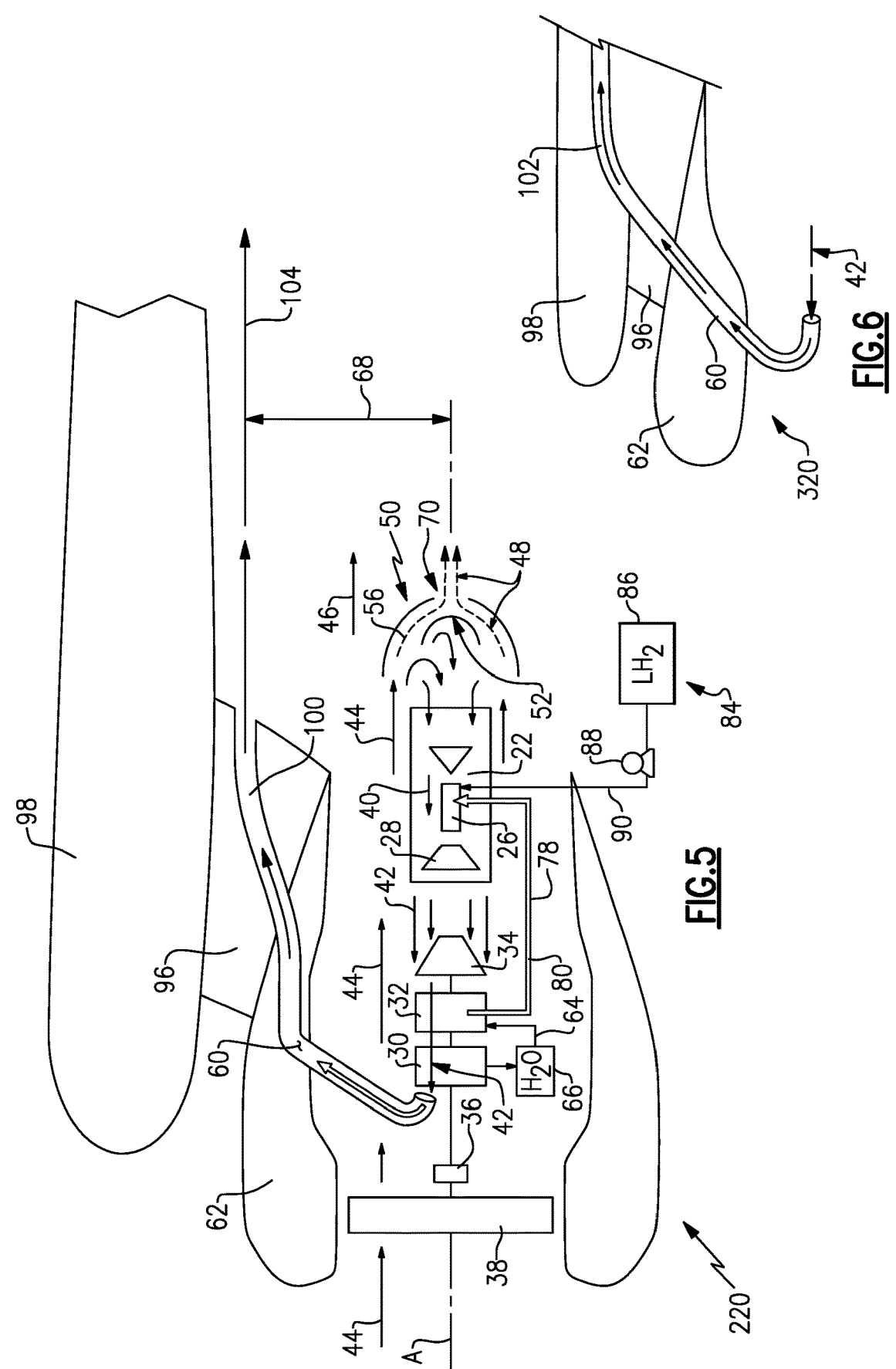
FIG. 5 is a schematic view of yet another example propulsion system embodiment.
FIG. 6 is a schematic view of still yet another example propulsion system embodiment.

Referring to FIG. 5, another example engine assembly 220 is schematically shown and includes a portion of the exhaust duct 60 extending through a mount structure 96. The engine assembly 220 is supported on an aircraft wing 98 by the mount structure 96. In order to space exhaust flow 104 from the inlet flow 44, a portion of the duct 60 extends into the mount structure 96. The portion 100 of the duct 60 provides for further radial spacing from the inlet flow 44. Though described as an aircraft wing 98, this is not intended to be so limiting, and the engine assembly 220 may be mounted to a different portion of an airframe, such as a fuselage, empennage, or the like.

Referring to FIG. 6, a portion of another example engine assembly 320 is schematically shown and includes a portion 102 of the duct 60 within the wing 98. The portion 102 within the wing 98 provides for further spacing from the inlet flow 44. The portion 102 of the duct 60 within the wing 98 may extend well aft of the inlet flow 44. Moreover, the portion 102 of the duct 60 may open either to a top surface or bottom surface of the wing 98 to further separate any exhaust flow from the inlet flow 44.

Although example engine configurations are shown and described by way of example, it will be appreciated that other engine configurations may include additional structures and features and are within the contemplation and scope of this disclosure.

Accordingly, the disclosed assemblies provide an aft inlet that separates particulate matter from an inlet flow and prevents mixing of particulate matter and the exhaust gas flow.

Although an example embodiment has been disclosed, a worker of ordinary skill in this art would recognize that certain modifications would come within the scope of this disclosure. For that reason, the following claims should be studied to determine the scope and content of this disclosure.

What is claimed is:

1. A propulsion system for an aircraft comprising:
   a gas generating core engine disposed about an engine axis;
   a propulsor driven by an exhaust gas flow generated by the gas generating core engine;
   an inlet assembly where an inlet airflow is communicated to the gas generating core engine, the inlet assembly is disposed aft of the gas generating core engine and includes
   an inlet opening to a turning duct directing inlet air into the gas generating core engine,
   a particulate passage radially outward of the turning duct,
   an annular particulate inlet, and
   a particle exhaust outlet directing particulates away from the gas generating core engine,
   wherein the turning duct is centered along and across the engine axis and the particle exhaust outlet is disposed along the engine axis aft of the turning duct.

2. The propulsion system as recited in claim 1, including an exhaust duct routing an exhaust gas flow away from the gas generating core engine, the exhaust duct spaced radially apart from the inlet opening of the turning duct.

3. The propulsion system as recited in claim 2, wherein the exhaust duct is spaced radially apart from the particle exhaust outlet.

4. The propulsion system as recited in claim 2, including a nacelle surrounding the gas generating core engine and defining a bypass flow path, wherein the exhaust duct is disposed within the nacelle.

5. The propulsion system as recited in claim 1. wherein the annular particle inlet is aft of the inlet opening for inlet airflow.

6. The propulsion system as recited in claim 1, wherein the gas generating core engine includes a turbine section engine forward of a combustor section and a compressor section and the inlet assembly communicates inlet airflow into the compressor section.

7. The propulsion system as recited in claim 6, including a power turbine coupled to drive the propulsor, the power turbine is engine forward of the turbine section and is rotatable independent of the turbine section by at least a portion of the exhaust gas flow.

8. A propulsion system for an aircraft comprising:
   a gas generating core engine where an exhaust gas flow is generated to drive a turbine section that is engine forward of a combustor section and a compressor section;
   a propulsor driven by the exhaust gas flow generated by the gas generating core engine;
   a power turbine coupled to drive the propulsor, the power turbine is engine forward of the turbine section and is rotatable independent of the turbine section by at least a portion of the exhaust gas flow;

an inlet assembly where an inlet airflow is communicated to the gas generating core engine, the inlet assembly is disposed aft of the gas generating core engine and includes an inlet opening, a turning duct where inlet airflow is communicated engine forward into the compressor section, a particle passage, an annular particle inlet, and a particle exhaust outlet that directs particulates away from the gas generating core engine, wherein the turning duct is centered along and across the engine axis and the particle exhaust outlet is disposed along the engine axis aft of the turning duct; and an exhaust duct routing the exhaust gas flow away from the gas generating core engine, the exhaust duct spaced radially apart from particle exhaust outlet.

9. The propulsion system as recited in claim 8, including a nacelle surrounding the gas generating core engine and defining a bypass flow path, wherein at least a portion of the exhaust duct is disposed within the nacelle.

10. The propulsion system as recited in claim 8, wherein the turning duct is configured to turn the inlet airflow radially inward and axially forward through an outlet where the inlet airflow is directed axially forward into the gas generating core engine, wherein the inlet assembly includes the annular particle inlet disposed radially outward from the turning duct, the annular particle inlet is where particles within the inlet airflow are directed radially inward toward the particulate exhaust outlet.

11. The propulsion system as recited in claim 8, wherein the annular particle inlet is aft of the inlet opening for inlet airflow.

\* \* \* \* \*